United States Patent [19]
Allmandinger et al.

[11] 3,804,477
[45] Apr. 16, 1974

[54] CENTRIFUGAL BEARING PRELOAD MECHANISM

[75] Inventors: Otto Richard Allmandinger, Cincinnati, Ohio; John X. Russell, Troy, Mich.

[73] Assignee: Cincinnati Milacron Inc., Cincinnati, Ohio

[22] Filed: Jan. 19, 1973

[21] Appl. No.: 325,075

[52] U.S. Cl. .............................................. 308/207
[51] Int. Cl. ............................................ F16c 29/12
[58] Field of Search............ 308/189 A, 207 A, 178

[56] References Cited
UNITED STATES PATENTS
2,727,796    12/1955   Gordon, Jr. .....................308/178

Primary Examiner—Charles J. Myhre
Assistant Examiner—Frank Susko
Attorney, Agent, or Firm—Alfred L. Mangels; Howard T. Keiser; Daniel P. Worth

[57] ABSTRACT

An adjustable bearing preloading mechanism which can apply a high bearing preload under low speed operating conditions and which operates to reduce the preload under high speed conditions to minimize heat build-up and subsequent wear in the bearing and to reduce horsepower requirements at high speeds. The device is substantially a flexible annular disc including a plurality of weights positioned adjacent its inner diameter and which is in contact with one of the races of a bearing to impart a preload thereto. The device rotates with the shaft supported by the bearing, and as the shaft speed increases centrifugal force acting on the weights causes an axial deflection at the inner diameter of the annular disc to reduce the preload on the bearings.

7 Claims, 4 Drawing Figures

CENTRIFUGAL BEARING PRELOAD MECHANISM

BACKGROUND OF THE INVENTION

This invention relates to bearing preloading devices, and more particularly to a bearing preloading device which is responsive to shaft speed to reduce the loading on the bearing as the shaft rotational speed is increased.

The application of axial preloads to bearings supporting rotating shafts is well-known to those skilled in the machinery art. The preload is generally applied by means of a threaded nut which is brought up against the race of one of the bearings and tightened against it to apply the desired amount of axial load. The preload serves to eliminate excessive play in the bearings and thereby causes the shaft to rotate about a single axis, which is desirable in connection with shafts utilized in precision machinery in which shaft run-out, or axial shifting of the shaft, would be undesirable.

When the bearing preload is applied at a constant value over the entire rotational speed spectrum of the shaft, it is possible that at high speeds excessive heat can be generated with the same degree of preload as is applied at low speeds, and that heat could operate to damage or even destroy the bearings. Thus it is desirable that some means be provided to vary the amount of preload so that at low speeds a relatively high preload can be applied, whereas at high speeds the amount of preload can be reduced to avoid damage to the bearings. This preload—speed relationship substantially conforms with the requirements for a machine tool in which the shaft is required to turn in a single axis to minimize any axial shift. Under low speed conditions the liklihood is that heavy cuts are being taken on a metal cutting machine tool and thus the spindle would have to be securely supported, thereby dictating a high bearing preload. Conversely, at high speeds it is likely that the cutter is taking a light cut and therefore smaller loads are being applied to the shaft and thus lower preloads would be required to prevent axial shift, or shaft run-out.

It is an object of the present invention to overcome the deficiencies of the prior approaches to bearing preloading and to essentially provide a bearing preload device which is speed responsive to the extent that it imparts a smaller preload at a high shaft rotational speed than at low speeds.

SUMMARY OF THE INVENTION

Briefly stated, in accordance with one aspect of the present invention, a bearing preloading device is provided for applying an axial load to an antifriction bearing rotatably supporting a shaft in a housing. The preload device is essentially an annular disc which has a plurality of weights positioned on one side thereof adjacent to its inner diameter. The device is supported for rotation with a shaft and is positioned in concentric relationship with the shaft so that the surface opposite the weights bears against one or more of the bearing races. The device is held in position by a collar which can be adjusted to vary the load on the bearing race. As the speed of the shaft increases, the weights are urged outwardly by centrifugal force thus slightly deflecting the inner diameter of the disc in direction away from the bearings race, thereby reducing the preload thereon.

DESCRIPTION OF THE PREFERRED EMBODIMENTS

Figure 1:
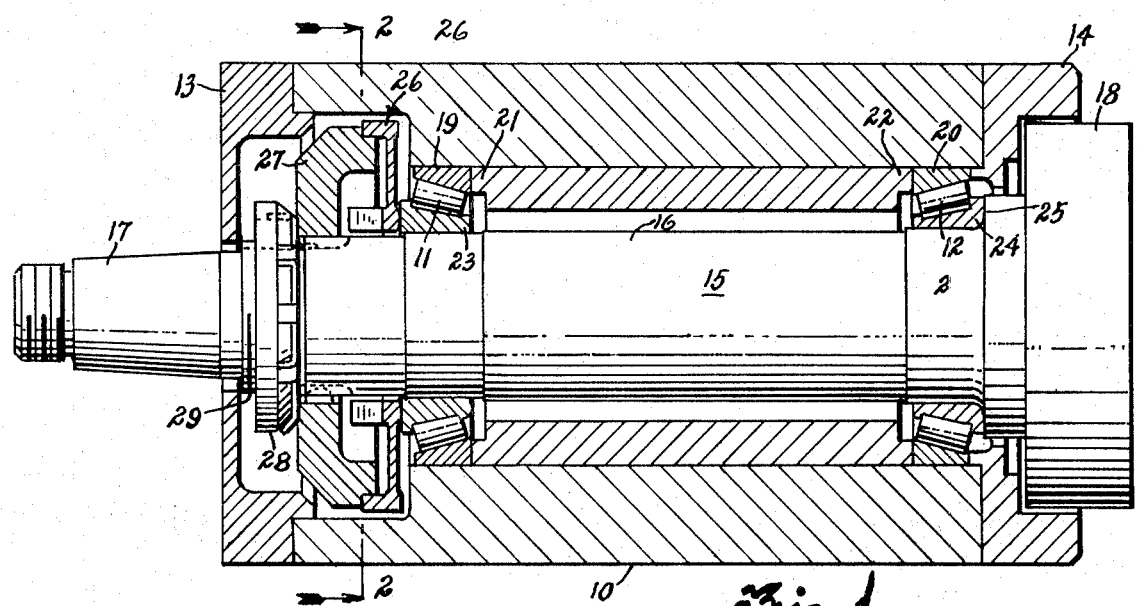
FIG. 1 is a cross sectional view of a spindle of a machine tool showing the preload device of the present invention in a typical operative environment.

Referring now to the drawings and particularly FIG. 1 thereof, there is shown a spindle housing of a machine tool within which a spindle is rotatably supported. The housing includes a cylindrical member 10 which supports the spindle bearings 11, 12 and includes annular members 13, 14 at each end to permit portions of the spindle 15 to extend therethrough.

The spindle includes a central portion 16 which is supported by bearings 11, 12 and a drive portion 17 at one end to permit the spindle to be rotated as, for example, by means of a belt and pulley arrangement (not shown), and a tool driving means 18 at the opposite end and to which a chuck or other type of tool holder (not shown) can be rigidly secured.

Bearings 11, 12 are positioned at spaced locations along spindle 15 and the outer races 19, 20 are fitted into cylindrical member 10 at a predetermined spacing and with the innermost portion of each of outer races 19, 20 bearing against cooperating shoulders 21, 22 respectively, machined into cylindrical member 10.

The inner races 23, 24 of bearings 11, 12, respectively, rest against spindle 15. Bearing 12 has its inner race 24 resting against a machined step 25 in spindle 15 to prevent the race from moving axially outwardly toward tool driving means 18. Bearing 11 is fitted onto spindle 15 and is axially held in position by means of a disc-shaped preload member 26. Preload member 26 is, in turn, held against inner race 23 of bearing 11 by means of a driving collar 27, which is keyed to spindle 15 to cause the same to rotate therewith and at the same time to impart the rotation of the spindle to the preload member. Collar 27 is secured axially be means of a nut 28, which can be adjusted by means of threads 29 to vary the compressive force applied to inner race 23 by means of preload member 26.

Figure 2:
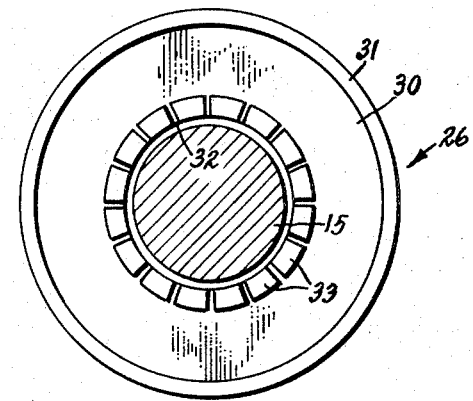
FIG. 2 is an end view of the preload device of the present invention taken along the line 2—2 of FIG. 1.

Preload member 26 is shown in elevation in FIG. 2 and comprises an annular central portion 30 which has an outer portion 31 that cooperates with driving collar 27 which radially positions the preload member, and has an inner portion 32 having a diameter somewhat greater than that of the spindle at the position of mounting but which is of such a size as to cause one side of inner portion 32 to bear against inner race 23 of bearing 11. Attached to inner portion 32 of preload member 26 on the face opposite that which bears against inner race 23 is a plurality of weights 33 positioned adjacent the innermost diameter of inner portion 32. In the embodiment shown, preload member 26 has 16 weights substantially equally spaced about the inner diameter of preload device 26, but it is not necessary that that specific number of weights be employed. For example, it would be possible to provide preload member 26 with only four weights which are preferably positioned equally about the inner diameter, or 90° apart. The number and size of weights employed is a function of the material of which the web is formed, the thickness of the web, and the speed at which the preload member is to be rotated. Additionally, the weights can either be removably applied to the web or can be formed integrally therewith and defined by means of a plurality of substantially radial slots machined in an enlarged inner portion 32 having greater axial length than that of annular portion 30, as shown in FIG. 3.

In operation, the initial preload to be applied to the spindle bearings is determined by the position of driving collar 27 with respect to inner race 23, the greater the deflection of annular portion 30 of preload member 26, the greater the corresponding preload on the bearings. When the desired preload is achieved, adjusting nut 28 is locked into position and the spindle can then be operated to turn whatever type of tool that may be desired.

Figure 3:
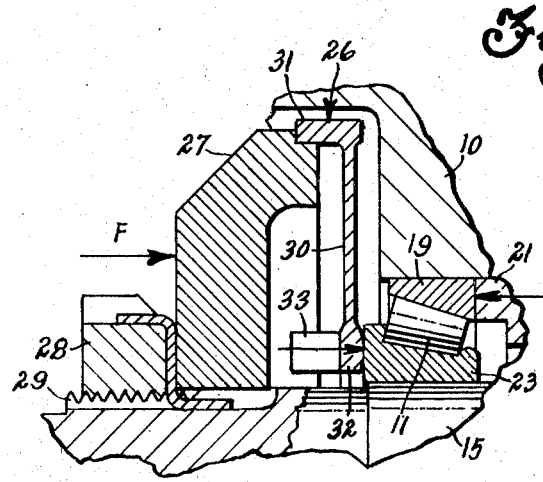
FIG. 3 is a fragmentary cross-sectional view showing the preload device of the present invention in either a static or a low speed condition.

The initial preload and its effect upon the various portions of the spindle system is indicated in FIG. 3. As therein shown, the force F supplied by driving collar 27 is transmitted to preload member 26 which, in turn, transmits it uniformly to inner race 23 of the bearing. In order to maintain equilibrium, outer race 19 of bearing 11 exerts an equal and opposite force and thus bearing 11 is in a state of preload to insure that the spindle rotates in a single axis and is free from axial end play.

Figure 4:
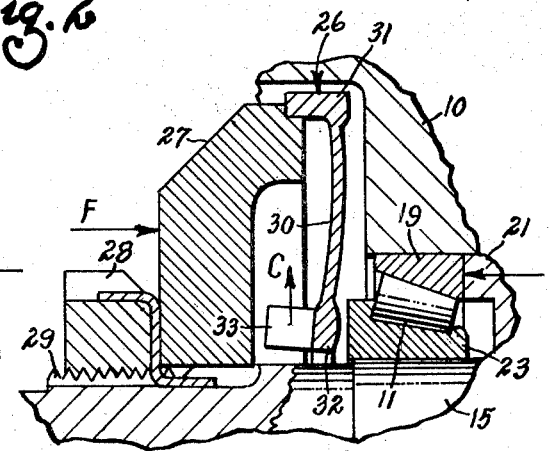
FIG. 4 is a fragmentary cross-sectional view similar to that of FIG. 3 but showing in exaggerated form, the preload device as it is affected by high speeds wherein the inner portion thereof is somewhat displaced from the bearing race as a result of deflection due to centrigual force.

The effect of increasing speed on the device is shown in FIG. 4, wherein an increase in speed has the effect of imparting a centrifugal force C on weights 33, which acts radially as shown and urges weights 33 forwardly toward driving collar 27 and radially outwardly from the axis of spindle 15. The center of gravity of weights 33 is spaced axially forwardly from the web and the effect of the centrifugal force C is to cause a slight bending of annular portion 30 away from inner race 23 of bearing 11, thereby reducing the amount of axial load imparted thereto by preload member 26. The deflection of annular portion 30 need be very small to change the load on the bearing and is shown greatly exaggerated in FIG. 4 merely to illustrate the effect of the centrifugal force. Typically, the amount of deflection experienced is of the order of a few thousandths of an inch or less, and preload member 26 remains in contact with inner race 23. It is also apparent that the flexible nature of annular portion 30 will permit axial expansion of the entire assembly due to heating and that the centrifugal force on the weights will also tend to reduce the additional axial load resulting from thermal expansion of the several parts of the spindle system. Furthermore, the surface contacting inner race 23 can be made convex as shown to provide line contact therewith, regardless of the load applied to inner race 23.

While particular embodiments of the invention have been illustrated and described, it will be apparent to those skilled in the art that various changes and modifications can be made without departing from the spirit and scope of the invention and is intended to cover in the appended claims all such changes and modifications that are within the scope of this invention.

What is claimed is:

1. A bearing loading device for applying an axial load to an antifriction bearing rotatably supporting a shaft in a housing, said device comprising:
   a. a bearing preload member in the form of an annular disc surrounding a shaft and having an inner diameter greater than the diameter of said shaft at the point where the disc is positioned, said preload member having one face thereof for positioning against a bearing and including a pluralcty of weights positioned on the side opposite said bearing and adjacent the inner diameter of said preload member;
   b. means for supporting said bearing preload member in substantially concentric relationship with said shaft for co-rotation therewith and for urging said preload member against said anti-friction bearing to impose a preload thereon.

2. The bearing loading device of claim 1 wherein said weights are defined by a thickened portion of said preload member positioned adjacent said inner diameter and on the side opposite said bearing, said thickened portion having a plurality of substantially radial slots extending partially therethrough.

3. The bearing loading device of claim 1 wherein the portion thereof contacting the bearing is convex to permit line contact therebetween regardless of the load applied to the bearing.

4. The bearing loading device of claim 1 wherein said preload member includes an outermost, generally axial flange which cooperatively engages a corresponding circular slot in said supporting means.

5. The bearing loading device of claim 1 wherein said supporting means comprises an annular collar substantially concentric with and surrounding said shaft, said annular collar engaging and supporting said preload member.

6. The bearing loading device of claim 5 wherein said collar is axially adjustable to vary the load applied to said bearing through said preload member.

7. The bearing loading device of claim 6 wherein the axial positioning of said collar is effected by a nut which engages threads on said shaft and which bears against said collar to urge it into contact with said preload member.

* * * * *